No. 648,865. Patented May 1, 1900.
C. GANZ.
BICYCLE GEARING.
(Application filed July 20, 1899.)
(No Model.)
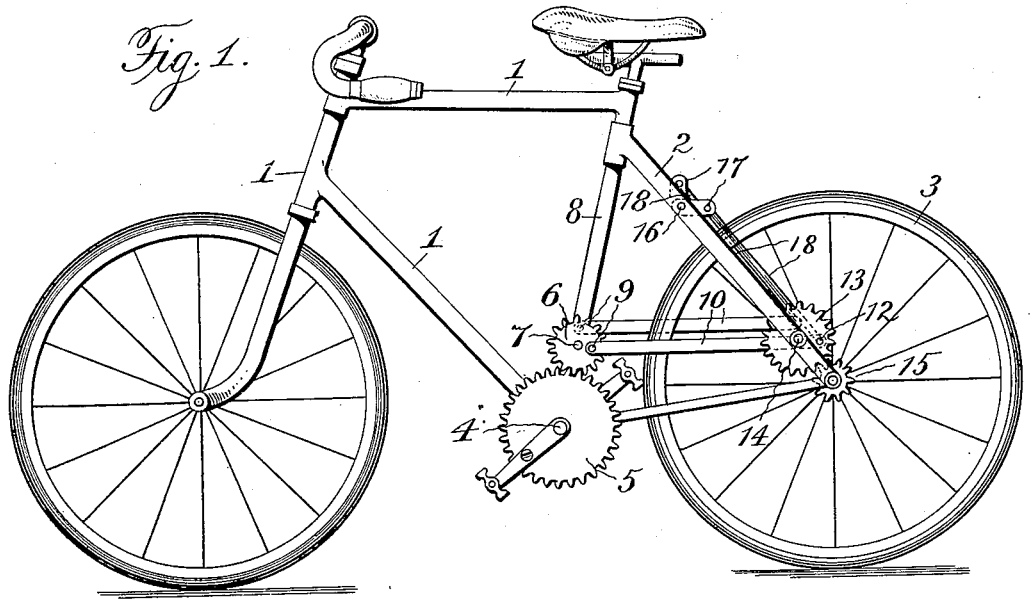
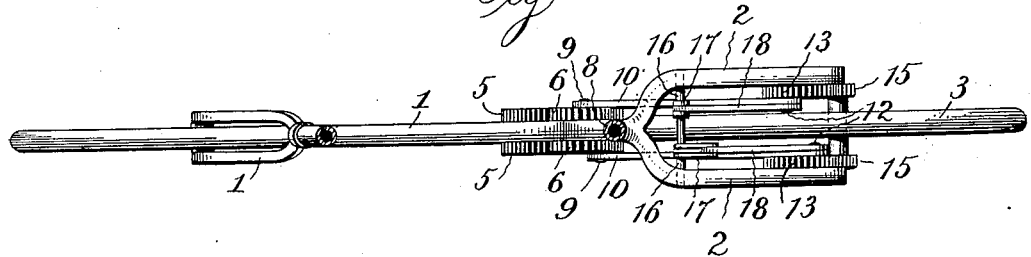
WITNESSES
Jas E. Hutchinson.
J. Granville Meyers Jr.
INVENTOR
Christian Ganz,
By James L. Norris
Attorney

UNITED STATES PATENT OFFICE.

CHRISTIAN GANZ, OF WASHINGTON, DISTRICT OF COLUMBIA.

BICYCLE-GEARING.

SPECIFICATION forming part of Letters Patent No. 648,865, dated May 1, 1900.

Application filed July 20, 1899. Serial No. 724,546. (No model.)

*To all whom it may concern:*

Be it known that I, CHRISTIAN GANZ, a citizen of the United States, residing at Washington, in the District of Columbia, have invented new and useful Improvements in Chainless Gear for Bicycles, of which the following is a specification.

It is the purpose of my invention to provide a chainless gear for bicycles having such an organization that the power communicated from the crank-shaft through simple intermediate gearing to the shaft of the driving-wheel shall be exerted continuously upon the latter shaft, or practically so, instead of receiving intermittent impulses during a part only of the revolution of each pedal which is less than half of a complete turn or that portion during which the rider is able to press downward upon the pedals.

It is my object also to provide a chainless bicycle-gearing in which a dead-center cannot occur and in which the operative stroke of each pedal, or that portion of its revolution during which it is exerting propulsive force upon the driving-wheel, shall be materially increased in extent.

It is a further object of the invention to provide a system of gearing so organized and arranged as to equally distribute the strain over the bicycle-frame, thereby adding greatly to the life of the machine.

The invention consists in the novel parts and combination of the same hereinafter fully described and then particularly pointed out and defined in the claims which conclude this specification.

For the purposes of the following description reference is had to the accompanying drawings, in which—

Figure 1 is a side elevation showing a bicycle equipped with my invention. Fig. 2 is a plan view of the same.

The reference-numeral 1 in said drawings indicates the bicycle-frame, which may be of ordinary construction, and the numeral 2 denotes the rear fork, in which the driving-wheel 3 is arranged. The crank-shaft 4 is arranged at the same point as in bicycles now in use, and the bearings are of any preferred construction, these features forming no part of my invention. Upon the crank-shaft, between the pedal-bars and the frame of the machine, I rigidly mount two spur-gears 5, one upon each side of the frame. These gears mesh with two pinions 6, of less diameter than the gears and having their support on a shaft 7, which is placed on the post 8. Each of the pinions 6 is provided with a crank-pin or wrist 9, set at about one-quarter of a revolution apart and projecting from the outer faces of the pinions. To these crank-pins the ends of two pitmen 10 are connected, their other ends having a similar engagement with crank-pins 12, which project from the inner faces of two spur-gears 13, each arranged inside the rear fork 2 upon a stud 14, which is carried by the arm of said fork. These gears mesh with pinions 15, rigid on the driving-wheel shaft and arranged between said wheel and the arms of the fork.

At the upper end of the rear fork 2, which may be slightly prolonged, if necessary, is mounted a shaft 16, provided with two cranks 17, one on each side of the drive-wheel. These cranks are connected by pitmen 18 to the crank-pins 12 on the spur-gear 13, to which the ends of the pitmen 10 are connected. It will be seen that the line of thrust of the pitmen 18 is at an angle of about sixty degrees, more or less, with the line of thrust of the pitmen 10. The shaft 16 being continuous, instead of using two independent studs, like those supporting the spur-gears 13, a propulsive force exerted upon either of its cranks 17 will be at once communicated to the other crank. At those points where either of the pitmen 10 is inoperative or has its minimum force the other pitman 10 will be at its point of maximum advantage. The force which it imparts to its gear 13 will be in part communicated through the pitman 18, connected to said gear 13, to the crank 17 on the same side of the drive-wheel and from said crank through the shaft 16 and the second crank on said shaft to the other pitman 18 on the other side of the wheel. Thus the propelling force will be practically equalized on both sides. This arrangement has an important effect in equalizing the action of the gearing, thereby reducing the friction and wear upon the frame and giving a practically-uniform wear to the gear teeth. It also renders a "dead-center" impossible, adds hardly anything to the weight of the bicycle, and requires a nominal expense only for its production and incorporation.

The gears 5 and 13 and pinions 6 and 15 are of such relative size as may be desired in order to give the required speed to the bicycle, but this is a matter that is subject to constant change and may at any time be changed in a wheel having my invention.

What I claim, and desire to secure by Letters Patent of the United States, is—

1. In a chainless gear for bicycles, the combination with a drive-wheel having a pinion on each side, of driving-gears carried by studs projecting inward from the arms of the fork, two pinions driven by gears on the crank-shaft and connected by pitmen to the gears on said studs, and an auxiliary shaft having two cranks one on each side of the drive-wheel, each connected by a pitman to the driving-gear on the same side, substantially as described.

2. In a chainless gear for bicycles, the combination with a rear driving-wheel having a pinion on each end of its shaft, of spur-gears meshing with said pinions, an auxiliary shaft arranged above the drive-wheel and having two cranks located at an angle to each other, two pitmen each connected respectively, at one end to one of said cranks and at the opposite end to a crank-pin on the spur-gears, two pitmen operating to drive said spur-gears, a crank-shaft, and means operated by the crank-shaft for operating the said pitmen, substantially as described.

In testimony whereof I have hereunto set my hand in presence of two subscribing witnesses.

CHRISTIAN GANZ.

Witnesses:
F. B. KEEFER,
DENNIS SUMBY.